UNITED STATES PATENT OFFICE.

ISAAC M. MILBANK, OF GREENFIELD HILL, CONNECTICUT.

IMPROVEMENT IN EXPLOSIVE COMPOUNDS.

Specification forming part of Letters Patent No. 157,857, dated December 15, 1874; application filed April 30, 1874.

*To all whom it may concern:*

Be it known that I, ISAAC M. MILBANK, of Greenfield Hill, Connecticut, have invented a new and useful Fulminating Compound, of which the following is a full, clear, and exact description:

My invention has reference more particularly to fulminates used in caps, primers, and cartridges; and it consists in the combination of the several ingredients hereinafter named, and in the proportions set forth, and manner of mixing the same.

That others skilled in the art may make and use my invention, I will proceed to describe the exact manner in which I have carried it out.

In the preparation of my improved fulminate I use the following ingredients, viz: Chlorate of potash, twenty parts; prussiate of potash, ten parts; red phosphorus, one part.

In mixing these ingredients, I prefer to mix first the chlorate of potash and powdered glass in a dry state, varying the quantity of the latter according to circumstances, as is done in all fulminates; then stirring together the prussiate of potash and phosphorus in warm water. Pour this mixture into the first, and work the mass until all the parts are intimately mixed. In special cases the glass may be omitted without detriment. In caps to be fired on the nipple of a gun glass is not used, as its tendency would be to choke up the fine vent.

If it be desirable to use the fulminate dry, it must still be first wet with water, to impart to it a greater specific gravity, as well as to secure its intimate mixture, and afterward it is pulverized. When use in rim-fire cartridges, it is very important that it should be made as heavy as possible, and this is best attained by being even more than once saturated with water. The red phosphorus is preferred, because it is perfectly reliable and stable; not self-consuming, as with ordinary phosphorus, but burning only at a high temperature, and yet giving the compound when used in only minute proportions, comparatively, sufficient sensitiveness for all practical purposes.

My compound can be made more tenacious, if desired, by the use of starch, sugar, gum-arabic, and the like; or for filling primers through a perforated plate, a small portion of fine charcoal may be added with advantage to my compound.

Having thus described my invention, what I claim as new, and desire to secure by Letters Patent, is—

A fulminating compound composed of chlorate of potash, prussiate of potash, and red phosphorus, substantially in the proportions set forth.

ISAAC M. MILBANK.

Witnesses:
ALEX. R. T. NICHOLS,
HOWARD N. WAKEMAN.